United States Patent
Nomi et al.

[11] Patent Number: 6,030,289
[45] Date of Patent: Feb. 29, 2000

[54] VIDEO GAME APPARATUS, METHOD OF DISPLAYING MODELS IN VIDEO GAME APPARATUS, AND COMPUTER-READABLE RECORDING MEDIUM FOR USE WITH VIDEO GAME APPARATUS

[75] Inventors: Mitsuhiro Nomi; Tadasu Kitae, both of Nishinomiya, Japan

[73] Assignee: Konami Co., Ltd., Hyogo-ken, Japan

[21] Appl. No.: 08/882,457

[22] Filed: Jun. 25, 1997

[30] Foreign Application Priority Data

Jun. 27, 1996 [JP] Japan ................................. 8-167843

[51] Int. Cl.[7] ........................................... A63F 9/24
[52] U.S. Cl. .............................................. 463/32; 463/31
[58] Field of Search .................................. 463/32, 30, 31, 463/33, 34, 46, 47; 273/148 R, 309, 148 B; 345/139, 419, 114, 126

[56] References Cited

U.S. PATENT DOCUMENTS

| | | | |
|---|---|---|---|
| 4,167,019 | 9/1979 | Sheppard | 463/33 |
| 5,577,960 | 11/1996 | Sasaki | 463/31 |
| 5,616,079 | 4/1997 | Iwase et al. | 463/32 |
| 5,734,807 | 3/1998 | Sumi | 463/32 |
| 5,769,718 | 6/1998 | Rider | 463/32 |
| 5,938,530 | 8/1999 | Watanabe | 463/31 |

FOREIGN PATENT DOCUMENTS

WO95/35140  12/1995  Japan ..................... 463/33

*Primary Examiner*—Valencia Martin-Wallace
*Assistant Examiner*—Sheila Clayton
*Attorney, Agent, or Firm*—Jordan and Hamburg LLP

[57] ABSTRACT

An inverted polygon data memory stores inverted polygon data generated in advance, among models to be considered for reflection on a water surface, of those models whose polygon data are stored in a polygon data memory. Based on an image display graphic command from a CPU, an image display processor processes graphics data and sends image data to a frame buffer. The image display graphic command comprises data generated by a graphics data generator based on the data stored in the inverted polygon data memory and the polygon data memory. An image including models of the inverted polygon data as being reflected on the water surface is displayed in real-time in a three-dimensional game space on a display monitor so as to be quickly movable in response to movement of the viewpoint of a game character that is also displayed in the three-dimensional game space.

12 Claims, 3 Drawing Sheets

VIDEO GAME APPARATUS, METHOD OF DISPLAYING MODELS IN VIDEO GAME APPARATUS, AND COMPUTER-READABLE RECORDING MEDIUM FOR USE WITH VIDEO GAME APPARATUS

BACKGROUND OF THE INVENTION

1. Field of the Invention

The present invention relates to a video game apparatus for displaying in real-time a three-dimensional image on a display screen while the image varies depending on the position and direction of movement of a game character that moves on a water surface or the like displayed in a game space on the display screen according to operation of a manual controller, a method of displaying a plurality of models in the game space on the display screen of the video game apparatus, and a computer-readable recording medium which stores a program for controlling the video game apparatus.

2. Description of the Prior Art

There have been known driving video game apparatuses that are played by game players for simulating the driving of a vehicle, such as an automobile, on the display screen. One type of those driving video game apparatuses is played by the game player to manipulate a displayed game character to ride on a hydroplane thereby simulating the driving of the hydroplane on water.

Attempts have been made to give a realistic look to displayed images of such a video game apparatus by displaying reflections of nearby buildings, structures, and game characters on the displayed water surface. There have heretofore been available two major computer graphic techniques for displaying a water surface together with building, structure, and game character reflections thereon.

According to the first computer graphic technique, if a game character or a building is displayed as a dot-matrix image, then the dot-matrix image is vertically inverted or another dot-matrix image which is vertically inverted from the dot-matrix image is generated in advance, and is displayed over a displayed water surface.

According to the second computer graphic technique, if a game character or a building is displayed as polygons, a reflected image thereof is obtained by a mirror inversion process that carries out successive calculations to determine how those polygons are reflected on a displayed water surface.

The dot-matrix image displayed according to the first computer graphic technique is a two-dimensional image which represents a reflection on the displayed water surface from the position and direction of a certain fixed viewpoint. If the game character or the building is expressed three-dimensionally, then even when the dot-matrix image is accurately calculated, it is difficult to display it so as to follow the position of the viewpoint as the game character moves on the water surface.

The second computer graphic technique allows the reflected image to be accurately representative of the game character or the building that is displayed as polygons. However, since the successive calculations carried out by the mirror inversion process are time-consuming, the second computer graphic technique is not suitable for use with video games which are required to display images in real-time in quick response to manual operation by the game player.

SUMMARY OF THE INVENTION

It is therefore an object of the present invention to provide a video game apparatus which is capable of displaying in real-time on a display monitor an image, reflected on an optical reflecting surface, of models displayed in a three-dimensional game space in a manner to quickly respond to movement of a viewpoint of a game character which is also displayed in the three-dimensional game space.

According to the present invention, there is provided a video game apparatus comprising model data memory means for storing coordinates of vertices of polygons which make up a plurality of models in a three-dimensional game space and coordinates of a flat surface in the three-dimensional game space, character moving means for moving a game character in the three-dimensional game space in response to operation by a game player, inverted polygon data output means for determining coordinates of vertices of polygons which are inverted symmetrically with respect to the flat surface from those polygons which make up at least one of the models, and image display processing means for visually displaying the models and the inverted polygons so as to be movable depending on the position of a viewpoint of the game character and the direction of a line of sight of the game character.

In response to operation by the game player, the game character is moved in the three-dimensional game space, and the models that are also moved in the three-dimensional game space depending on the position of the viewpoint of the game character and the direction of the line of sight of the game character are visually displayed. At this time, the models are displayed depending on the position of the viewpoint of the game character and the direction of the line of sight of the game character. The coordinates of vertices of polygons which are inverted symmetrically with respect to the flat surface from those polygons which make up at least one of the models, are determined, and the inverted polygons are displayed as models reflected on the flat surface depending on the position of the viewpoint of the game character and the direction of the line of sight of the game character. The video game thus played by the video game apparatus looks highly realistic to the eye of the game player.

The image display processing means comprises means for displaying the flat surface as an optically reflecting surface. The optically reflecting surface may be a water surface of a sea, a lake, or a river, or a building wall covered with a window glass pane.

The models include geometric models and structural models, and the inverted polygon data output means comprises means for determining coordinates of vertices of inverted polygons of at least one of the structural models.

The inverted polygon data output means has inverted polygon data memory means for storing the determined coordinates of vertices of inverted polygons.

Since the coordinates of vertices of polygons which are inverted symmetrically with respect to the flat surface from those polygons which make up at least one of the models, are determined and stored, the models which are reflected on the flat surface can be displayed reliably in real-time without the need for a long period of time for calculations.

The video game apparatus further comprises inverted polygon texture data memory means for storing texture data to be mapped onto the inverted polygons, the image display processing means comprising means for displaying the inverted polygons with the texture data mapped thereonto.

If the flat surface is a water surface, then the texture data of the polygons of the models reflected on the flat surface may be texture data representing dummy waves comprising wave patterns superposed on the polygons which are not inverted, texture data corrected in color to match the color of the water surface, and texture data of polygon models whose colors are closer to the color of the water surface as their distance from the water surface is greater. These texture data make the video game look highly realistic.

According to the present invention, there is also provided a video game apparatus comprising model data memory means for storing coordinates of vertices of polygons which make up a plurality of models in a three-dimensional game space and coordinates of a water surface in the three-dimensional game space, character moving means for moving a game character in the three-dimensional game space in response to operation by a game player, and image display processing means for visually displaying the models and the inverted polygons so as to be movable depending on the position of a viewpoint of the game character and the direction of a line of sight of the game character, the models including underwater models positioned below the water surface, the underwater models comprising polygons having vertices whose coordinates are established to allow the underwater models to be seen refracted through the water surface.

With this arrangement, in response to operation by the game player, the game character is moved in the three-dimensional game space, and the models that are also moved in the three-dimensional game space depending on the position of the viewpoint of the game character and the direction of the line of sight of the game character are visually displayed. The underwater models are displayed depending on the position of the viewpoint of the game character and the direction of the line of sight of the game character. The coordinates of the vertices of the polygons of the underwater models are established to allow the underwater models to be seen refracted through the water surface. Because the underwater models are displayed as if seen through the water surface, the video game is rendered highly realistic to the eye of the game player.

According to the present invention, there is further provided a method of displaying a plurality of models in a three-dimensional game space in a video game apparatus having a game character displayed in the three-dimensional game space and movable in response to operation by a game player, comprising the steps of constructing the models with polygons, establishing a flat surface in the three-dimensional game space, determining coordinates of vertices of polygons which are inverted symmetrically with respect to the flat surface from those polygons which make up at least one of the models, and visually displaying the models and the inverted polygons so as to be movable depending on the position of a viewpoint of the game character and the direction of a line of sight of the game character.

According to the present invention, there is also provided a computer-readable recording medium which stores a game program for operating a video game apparatus to move a game character in response to operation by a game player, in a three-dimensional space including a plurality of models comprising polygons and a flat surface, the game program being readable by a computer to operate the video game apparatus by determining coordinates of vertices of polygons which are inverted symmetrically with respect to the flat surface from those polygons which make up at least one of the models, and visually displaying the models and the inverted polygons so as to be movable depending on the position of a viewpoint of the game character and the direction of a line of sight of the game character.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
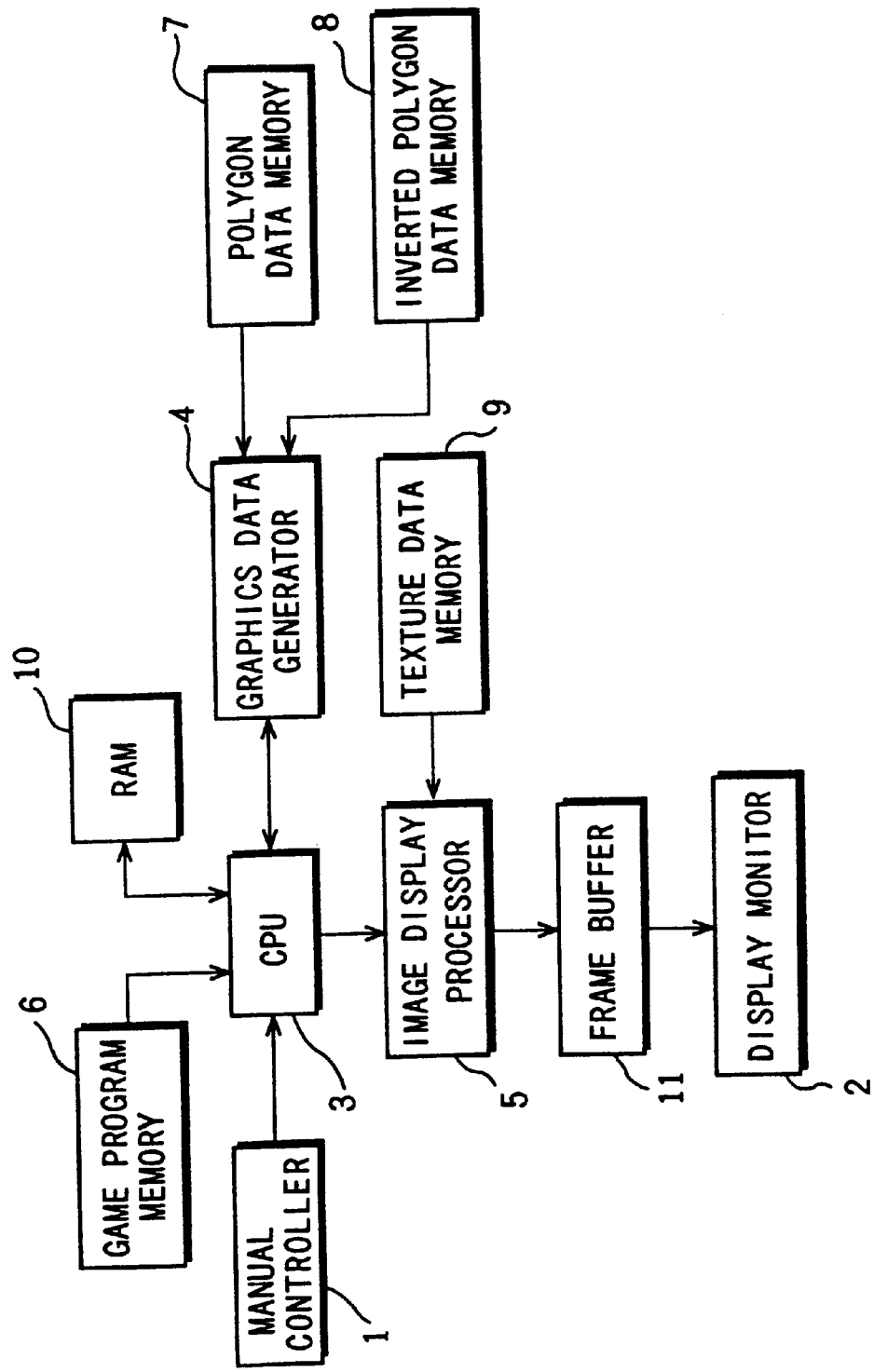
FIG. 1 is a block diagram of a video game apparatus according to the present invention.

As shown in FIG. 1, a video game apparatus according to the present invention comprises a manual controller 1 that can be operated by a game player, a display monitor 2 for displaying game images, a CPU (Central Processing Unit) 3 for controlling operation of the video game apparatus, a graphics data generator 4 for generating graphic data, an image display processor 5 for processing graphics data from the graphics data generator 4 into image data to be displayed, a game program memory 6 for storing a video game program, a polygon data memory 7 for storing polygon data, an inverted polygon data memory 8 for storing inverted polygon data, a texture data memory 9 for storing texture data, a RAM (Random-Access Memory) 10 for temporarily storing processed data, and a frame buffer 11 for storing image data to be sent to the display monitor 2.

Each of the game program memory 6, the polygon data memory 7, the inverted polygon data memory 8, and the texture data memory 9 comprises a ROM (Read-Only Memory).

The manual controller 1 is manually operable by the game player while the game player is seeing images displayed on the display monitor 2. Control signals produced by the manual controller 1 as it is operated by the game player are transmitted to the CPU 3.

It is assumed that a video game played on the video game apparatus is a hydroplane driving simulation game in which the game player controls a displayed game character to ride on a hydroplane and drive the hydroplane thereby simulating the driving of the hydroplane on water.

In response to the operation by the game player of the manual controller 1, the CPU 3 controls operation of the video game apparatus for playing the hydroplane driving simulation game according to the game program stored in the game program memory 6. The CPU 3 can perform the following two major functions A, B:

A. Viewpoint calculating function:

Based on a control signal from the manual controller 1, the CPU 3 calculates the distance that the game character has moved and the angle through which the game character has angularly moved, i.e., calculates the position of the viewpoint of the game character and the direction of the line of sight of the game character, and stores the calculated data in the RAM 10. For example, depending on the direction in which a steering wheel or a steering control unit on the manual controller 1 is turned and the angular displacement of the steering wheel, the CPU 3 calculates the direction of the line of sight of the game character as it varies laterally, and also calculates the position of the viewpoint of the game character as it varies laterally. When an accelerator pedal or an acceleration control unit on the manual controller 1 is depressed or operated to a greater extent, the CPU 3 calculates an increased speed of the game character.

B. Data input/output function:

The CPU 3 transmits the calculated data from the RAM 10 to the graphics data generator 4 and transmits graphics data generated by the graphics data generator 4 to the image display processor 5.

The polygon data memory 7 stores the three-dimensional coordinates of the vertices of polygons which make up models representing various objects, such as game characters, geometric features, buildings, structures, etc. displayed on the display screen of the display monitor 2.

The inverted polygon data memory 8 stores inverted polygon, data generated in advance of those polygons up to a predetermined height, which are to be reflected on a displayed water surface among various models of buildings, bridges, tunnels, etc. that should be taken into consideration for reflection on the displayed water surface, of all the models stored in the polygon data memory 7. The inverted polygon data stored in the inverted polygon data memory 8 represent polygons each having vertices whose vertical positions (−z) are inversions, with respect to the water surface H (x, y, 0), of vertical positions (z) of the vertices of each of polygons above the water surface H (x, y, 0).

The texture data memory 9 stores texture data which are two-dimensional data to be mapped onto the inverted polygons. The two-dimensional data to be mapped onto the inverted polygons are determined depending on the distance from the inverted polygon data to the water surface according to the brightness of the models reflected on the water surface and also according to whether the water surface is a sea water surface or a river water surface.

The graphics data generator 4 executes geometric processing such as coordinate transformation and light source calculations. Specifically, the graphics data generator 4 effects coordinate transformation on the coordinate data of each of the vertices of the polygon data from the polygon data memory 7 and the inverted polygon data memory 8, and the distance and angle data from the CPU 3, for thereby determining new polygon vertex coordinate data. The graphics data generator 4 also effects light source calculations to determine the brightness of each of the vertices of the polygons depending on the distance to a hypothetically established light source, from the new polygon vertex coordinate data which have been determined.

Furthermore, the graphics data generator 4 determines address data in the texture data memory 10 of the texture data to be mapped onto the polygons, using the new polygon vertex coordinate data thus determined.

The graphics data generator 4 transmits the various data which have been produced back to the CPU 3, which then stores the received data in the RAM 10.

The image display processor 5 sends image data to be displayed to the frame buffer 1 based on an image display graphic command from the CPU 3.

The image display graphic command comprises:

two-dimensional data of the new polygon vertex coordinate data generated by the graphics data generator 4, i.e., polygon vertex address data representing address data in the frame buffer 11;

address data, representing storage positions in the texture data memory 10, of texture data to be mapped onto the polygons; and brightness data of the polygons.

The image display processor 5 maps the texture data onto the polygons, i.e., effects a texture mapping process for writing texture data corresponding to the range of the polygon vertex address data in the frame buffer 11.

The video game apparatus according to the present invention may be in the form of a video game machine for business use, a video game machine for home use, or a general personal computer. If the video game apparatus is a video game machine for business use, then the manual controller 1 has a steering wheel, an accelerator pedal, etc., and the display monitor 2 comprises a dedicated CRT or the like. If the video game apparatus is a video game machine for home use, then the manual controller 1 has a crisscross key and other control buttons, and the CPU 3, the graphics data generator 4, and the memories are housed in the video game machine itself, with the display monitor 2 being often a television monitor. If the video game apparatus is a personal computer, then the manual controller 1 comprises a keyboard and an input device such as a mouse, a track ball, or the like, and the display monitor 2 comprises a graphic display monitor, with the CPU 3, the graphics data generator 4, and the memories being housed in the personal computer.

If the video game apparatus is a video game machine for home use or a personal computer, then the video game program may initially be recorded in a computer-readable recording medium such as a floppy disk, a CD-ROM, a magnetooptical disk, a DVD-ROM, or the like, and then read from the recording medium into the video game machine or the personal computer by a reading unit therein.

Figure 2:
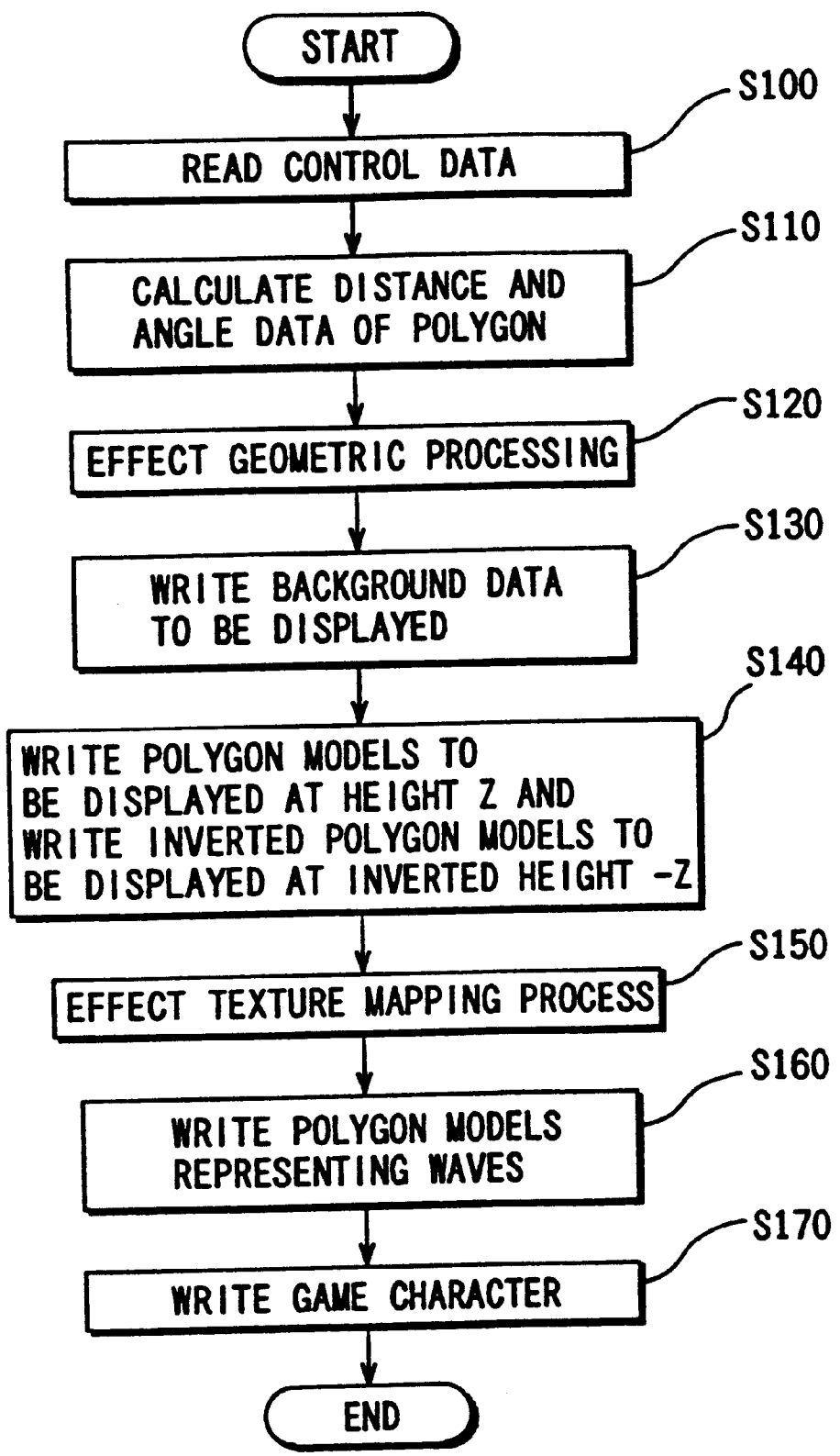
FIG. 2 is a flowchart of a display process carried out by the video game apparatus shown in FIG. 1.
Figure 3:
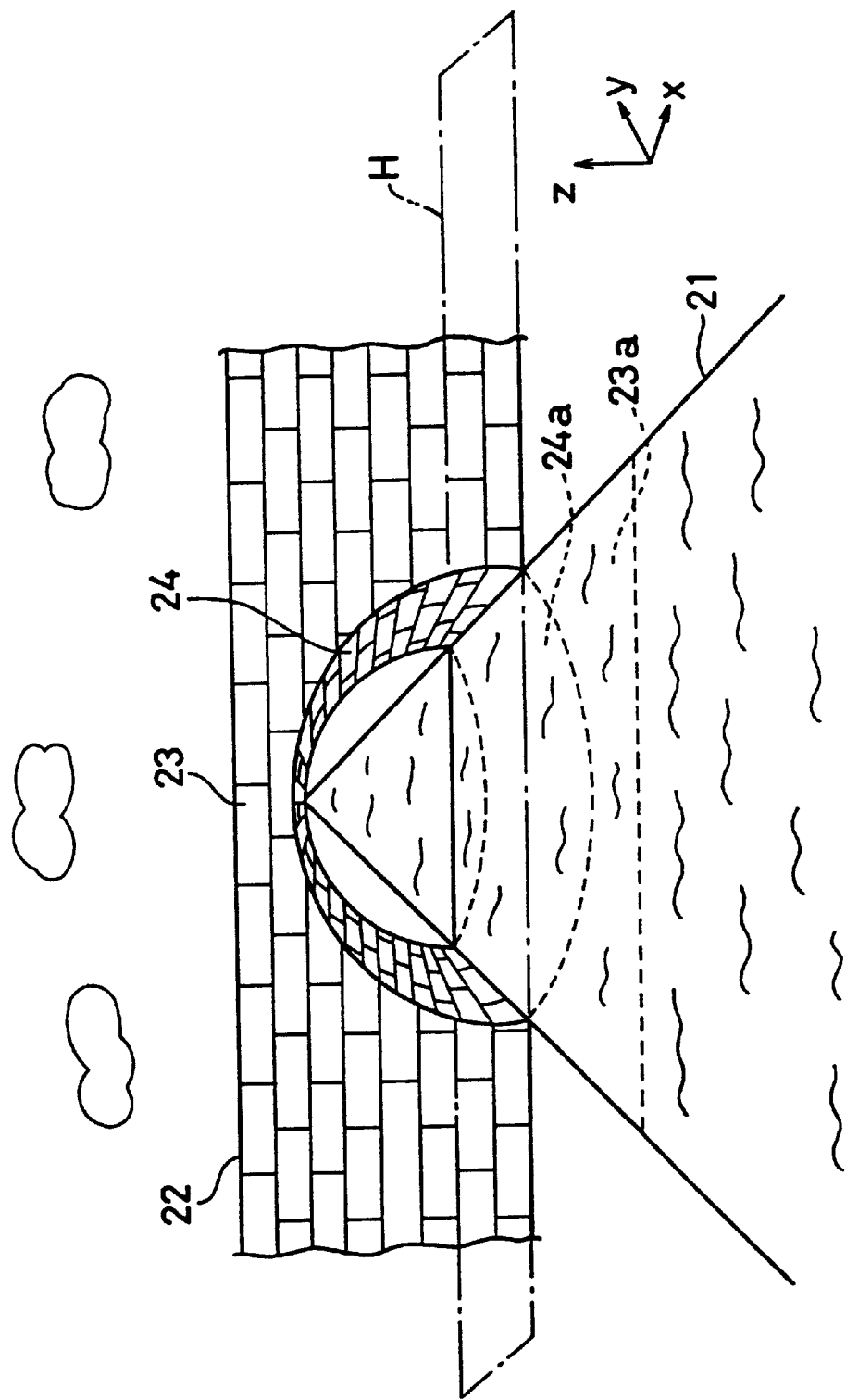
FIG. 3 is a view showing, by way of example, an image displayed in a three-dimensional game space on a display monitor of the video game apparatus shown in FIG. 1, the image including reflections on a displayed water surface.

FIG. 2 shows a display process carried out by the video game apparatus shown in FIG. 1. FIG. 3 shows, by way of example, an image displayed in a three-dimensional game space on the display monitor 2, the image including reflections on a displayed water surface.

When the game player operates the manual controller 1 and the manual controller 1 generates a control signal, the CPU 3 reads control data from the control signal in a step S100. If the control signal represents movement of the game character on the hydroplane, i.e., if the position of the viewpoint of the game character and the direction of the line of sight of the game character are moved, the CPU 3 calculates distance and angle data of each of the displayed polygons from the control data in a step S110.

The calculated distance and angle data are transmitted from the CPU 3 to the graphics data generator 4, which then carries out geometric processing such as coordinate transformation and light source calculations on the transmitted distance and angle data and three-dimensional coordinate data of the vertices of the polygons in a step S120.

The data generated by the graphics data generator 4 are transmitted through the CPU 3 to the image display processor 5. The image display processor 5 writes image data of a background to be displayed into the frame buffer 11 in a step S130, and then writes polygon models and inverted polygon models to be displayed at given heights z, −z in a step S140. Thereafter, the image display processor 5 executes a texture mapping process in a step S150.

Then, the image display processor 5 writes polygon models representing waves having a thin white texture in a step S160, and finally writes objects such as a game character and a hydroplane in a step S170.

Through the above process, it is possible to display on the display monitor 2 an image which includes a bridge whose lower and side surfaces are reflected on a displayed water surface as shown in FIG. 3. The reflections on the displayed water surface make the video game look realistic, attracting the game player to the video game.

The image shown in FIG. 3 is displayed as seen from the hydroplane which is moving on the water surface of a river 21, for example. In the displayed image, a bridge 22 over the river 21 has a side surface 23 and a lower surface 24 which are reflected as images 23a, 24a, inverted with respect to a surface H, on the water surface of the river 21.

Since the inverted polygon models are stored in the inverted polygon data memory 8 and supplied to the graphics data generator 4, no undue burden is imposed on the graphics data generator 4 as it carries out the geometric processing. The graphics data generator 4 can generate a reflected image of the lower surface 24 of the bridge 22, which cannot easily be represented by a dot-matrix image, making the video game look realistic.

The water surface of the river 21 may be displayed as a polygon model, and semitransparent texture data may be prepared for being mapped onto the polygon model of the water surface.

Instead of the inverted polygon data memory 8 for storing inverted polygon models, the video game apparatus may have a processor for calculating the vertical position (−z) of each vertex of the polygons only when the inverted polygons need to be displayed. Such a processor can process data at a rate higher than a processor which executes the mirror inversion process.

Rather than having polygon data for the water surface and waves, the texture data memory 10 may store, as texture data of inverted polygon models, dark blue texture data representing dummy waves comprising wave patterns superposed on the polygons which are not inverted, texture data corrected in color to match the color of the water surface, and texture data of polygon models whose colors are closer to the color of the water surface as their distance from the water surface is greater. With these texture data, it is easily possible to produce images that are distorted as if reflected on a wavy water surface, so that inverted polygon models may be seen as being reflected on the water surface.

The background image data, the polygon models, the inverted polygon models, the polygon models representing waves, and the game character may be written in any order rather than the sequence of the steps S130–S170 shown in FIG. 2.

The process of generating reflected images according to the present invention is not limited to the generation of images reflected on a displayed water surface, but may be applied to images reflected on other displayed surfaces, e.g., an image reflected on a building wall covered with window glass panes.

The polygon data memory 7 may also store data of polygon models to be displayed as underwater images. Specifically, the polygon data memory 7 may store data of polygon models whose vertex coordinates are compressed at a given ratio for being displayed as underwater images, with vertex coordinates of the polygon models above the water surface being uncompressed. The texture data memory 10 may store dark blue texture data to be mapped onto those polygon models to be displayed as underwater images. If these polygon model data and texture data are stored, then it is possible to display the underwater polygon models as if seen refracted through the water surface, so that the images displayed on the display monitor during the video game are made highly realistic to the eye of the game player.

Although a certain preferred embodiment of the present invention has been shown and described in detail, it should be understood that various changes and modifications may be made therein without departing from the scope of the appended claims.

What is claimed is:

1. A video game apparatus comprising:

model data memory means for storing coordinates of vertices of polygons which make up a plurality of models in a three-dimensional game space and coordinates of a flat surface in the three-dimensional game space;

character moving means for moving a game character in said three-dimensional game space in response to operation by a game player;

inverted polygon data output means for determining coordinates of vertices of inverted polygons which are inverted symmetrically with respect to said flat surface from those polygons which make up at least one of said models; and image display processing means for visually displaying said models and the inverted polygons so as to be movable depending on the position of a viewpoint of said game character and the direction of a line of sight of said game character.

2. A video game apparatus according to claim 1, wherein said image display processing means comprises means for displaying said flat surface as an optically reflecting surface.

3. A video game apparatus according to claim 1, wherein said models include geometric models and structural models, and said inverted polygon data output means comprises means for determining coordinates of vertices of inverted polygons of at least one of said structural models.

4. A video game apparatus according to claim 1, wherein said inverted polygon data output means has inverted polygon data memory means for storing the determined coordinates of vertices of inverted polygons.

5. A video game apparatus according to claim 1, further comprising:

inverted polygon texture data memory means for storing texture data to be mapped onto the inverted polygons; and said image display processing means comprising means for displaying said inverted polygons with the texture data mapped thereonto.

6. A video game apparatus according to claim 4, further comprising:

inverted polygon texture data memory means for storing texture data to be mapped onto the inverted polygons; and said image display processing means comprising means for displaying said inverted polygons with the texture data mapped thereonto.

7. A video game apparatus comprising:

model data memory means for storing coordinates of vertices of polygons which make up a plurality of models in a three-dimensional game space and coordinates of a water surface in the three-dimensional game space;

character moving means for moving a game character in said three-dimensional game space in response to operation by a game player;

image display processing means for visually displaying said models formed of said polygon and inverted polygons based on inversions of ones of said the polygons with respect to the water surface so as to be movable depending on the position of a viewpoint of said game character and the direction of a line of sight of said game character; and said models including underwater models positioned below said water surface, said underwater models comprising polygons having vertices whose coordinates are established to allow the underwater models to be seen refracted through said water surface.

8. A method of displaying a plurality of models in a three-dimensional game space in a video game apparatus having a game character displayed in the three-dimensional game space and movable in response to operation by a game player, comprising the steps of:

constructing said models with polygons;

establishing a flat surface in said three-dimensional game space;

determining coordinates of vertices of polygons which are inverted symmetrically with respect to said flat surface from those polygons which make up at least one of said models; and visually displaying said models and the inverted polygons so as to be movable depending on the position of a viewpoint of said game character and the direction of a line of sight of said game character.

9. A computer-readable recording medium having stored thereon a game program in the form of data and computer executable commands for execution by a computer having a display and an input means for inputting data into the computer by manual operations of a game player, said data and computer executable commands comprising:

model data including coordinates of vertices of polygons which make up a plurality of models in a three-dimensional game space and coordinates of a flat surface in the three-dimensional game space;

executable commands for operating said computer to move a game character in a three-dimensional game space in response to operation of said input means by the game player;

executable commands for providing coordinates of vertices of inverted polygons which are inverted symmetrically with respect to said flat surface from ones of the polygons which make up at least a portion of at least one of said models; and executable commands for visually displaying said at least one of said models and the inverted polygons so as to be movable depending on the position of a viewpoint of said game character and the direction of a line of sight of said game character.

10. A video game apparatus comprising:

model data memory means for storing coordinates of vertices of polygons which make up a plurality of models in a three-dimensional game space and coordinates of a flat surface in the three-dimensional game space;

character moving means for moving a game character in said three-dimensional game space in response to operation by a game player;

inverted polygon data output means for providing inverted polygon data for inverted polygons including coordinates of vertices which are inverted symmetrically with respect to said flat surface of ones of the polygons which make up at least a portion of one of said models so that a reflection image of said model on the flat surface is produced; and image display processing means for visually displaying said at least one of said models and the inverted polygons so as to be movable depending on the position of a viewpoint of said game character and the direction of a line of sight of said game character.

11. The video game apparatus according to claim 10 wherein said image display processing means simultaneously displays said at least one of said models and said inverted polygons.

12. A video game apparatus comprising:

model data memory means for storing coordinates of vertices of polygons which make up a plurality of models in a three-dimensional game space and coordinates of a water surface in the three-dimensional game space;

character moving means for moving a game character in said three-dimensional game space in response to operation by a game player;

image display processing means for visually displaying said models so as to be movable depending on the position of a viewpoint of said game character and the direction of a line of sight of said game character; and said models including underwater models positioned below said water surface, said underwater models comprising polygons having vertices whose coordinates are established to allow the underwater models to be seen refracted through said water surface.

* * * * *